Figure 1:
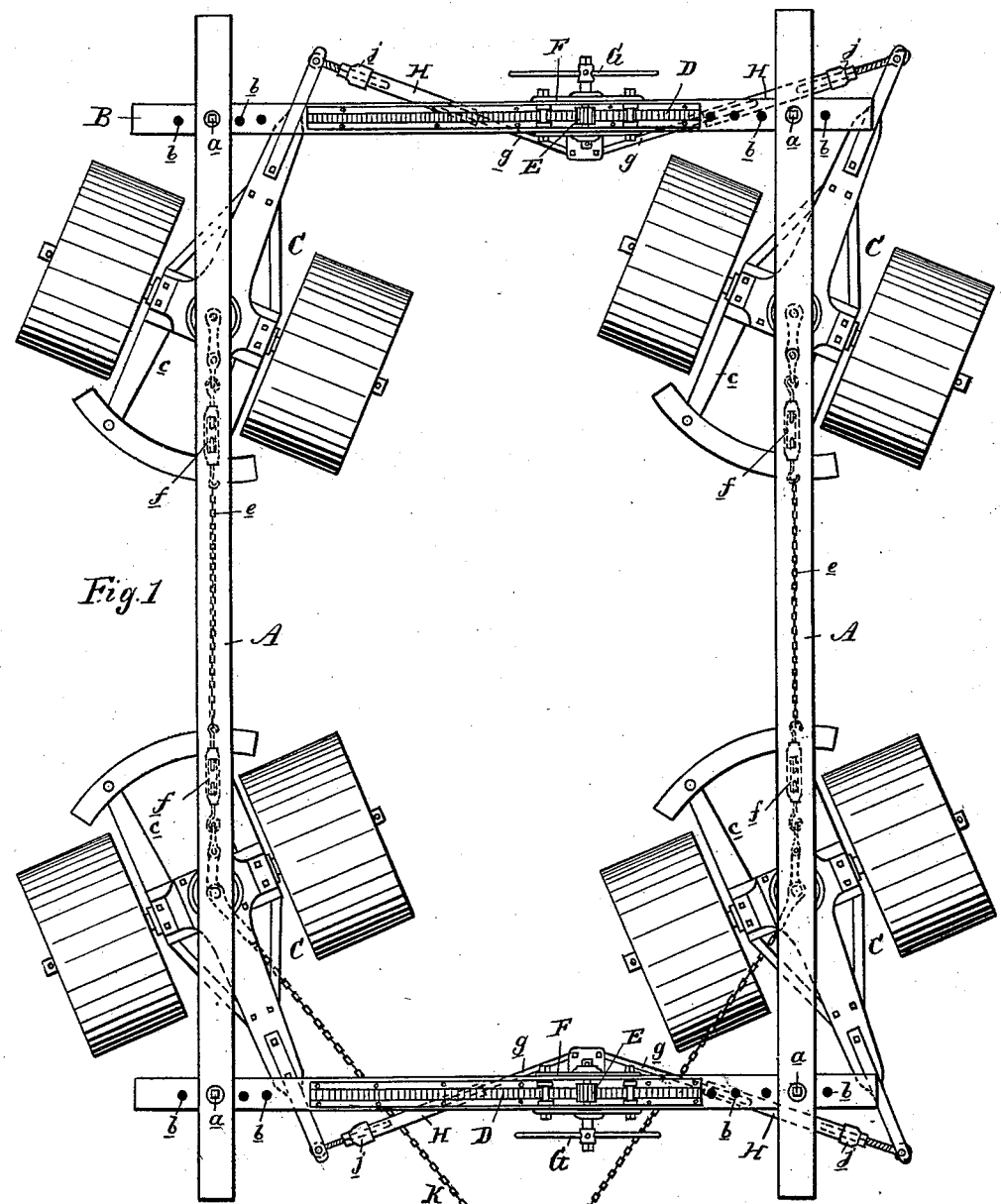

(No Model.) 2 Sheets—Sheet 1.

J. GOODMAN, Sr., F. A. & J. F. GOODMAN.
TRUCK FOR MOVING HOUSES.

No. 348,005. Patented Aug. 24, 1886.

Attest:
John Schipman.
Chas. Thurman.

Inventors:
Joseph Goodman, Sr.
Fredrick A. Goodman.
and
Julius F. Goodman.
by Att'y (No Model.) 2 Sheets—Sheet 2.
J. GOODMAN, Sr., F. A. & J. F. GOODMAN.
TRUCK FOR MOVING HOUSES.
No. 348,005. Patented Aug. 24, 1886.
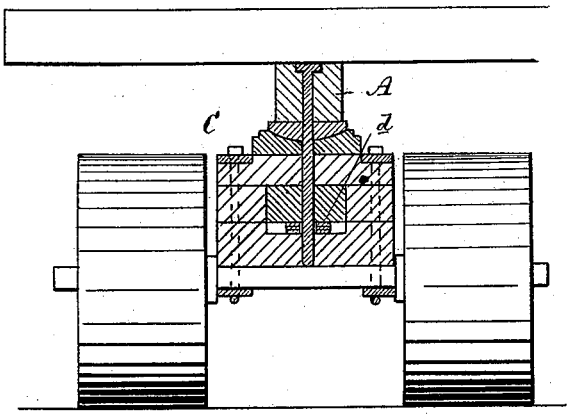
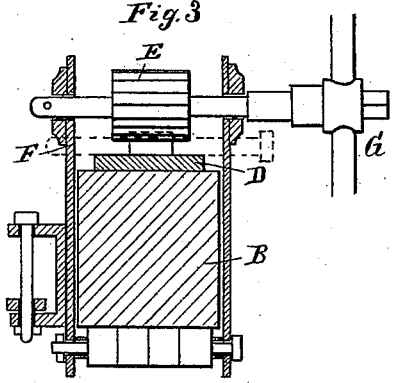
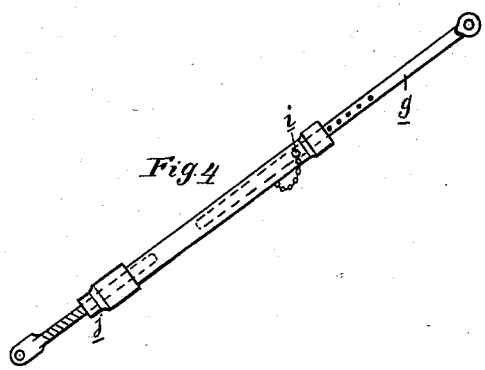
Attest:
John Coffeman.
Chas. Thurman.
Inventors:
Joseph Goodman, Sr.
Fredrick A. Goodman
and
Julius F. Goodman.
by Atty
Thos. S. Sprague

UNITED STATES PATENT OFFICE.

JOSEPH GOODMAN, SR., FREDRICK ALBERT GOODMAN, AND JULIUS FRANK GOODMAN, OF DETROIT, MICHIGAN.

TRUCK FOR MOVING HOUSES.

SPECIFICATION forming part of Letters Patent No. 348,005, dated August 24, 1886.

Application filed July 1, 1886. Serial No. 206,769. (No model.)

*To all whom it may concern:*

Be it known that we, JOSEPH GOODMAN, Sr., FREDRICK ALBERT GOODMAN, and JULIUS FRANK GOODMAN, of Detroit, in the county of Wayne and State of Michigan, have invented new and useful Improvements in Trucks for Moving Houses; and we hereby declare that the following is a full, clear, and exact description thereof, reference being had to the accompanying drawings, which form a part of this specification.

This invention relates to new and useful improvements in trucks for moving houses; and the object of our invention is to construct a truck that the same with its load may readily turn any street-corner, and travel on devious roads or streets with the same facility and rapidity as on straight ones; and to this end our invention consists in the peculiar construction of the truck and its steering-gear, all as hereinafter described.

In the drawings, which accompany this specification, Figure 1 is a plan of our improved truck. Fig. 2 is a vertical central section through one of the individual trucks. Fig. 3 is a vertical cross-section of the carriage of the steering-gear. Fig. 4 is a plan of one of the connecting-bars of the steering-gear.

A A are two longitudinal sleepers, adjustably connected in any suitable manner with the cross-girts B, bolts $a$ and adjusting-holes $b$ being shown in the drawings as the means for adjustably securing the parts together.

C are four two-wheeled trucks with broad-tired wheels, each truck having a central king-bolt, which pivotally connects the trucks with the frame. Each truck is provided with suitable hounds, $c$, and has a guide-pole, $d$, which, in the front trucks, extends in a forward direction and in the rear trucks in a rearward direction, and each rear truck is connected with the front truck by means of a draft-chain, $e$, in which is a turn-buckle, $f$, for tightening it. A rack-bar, D, is secured to the front and rear cross-girts, B, and a pinion, E, journaled in the carriage F, engages with the cogs of the rack-bar, and has a steering-wheel, G, secured to its shaft in such position that it may be convenient for operation. The carriage F is supported on the cross-girt by means of suitable travelers, so that it may travel readily in any direction in which the actuation of the steering-gear will draw it.

H are connecting-bars, pivotally secured to the ends of the guide-poles of the trucks and the front and rear carriage, respectively. These guide-poles are provided with suitable extension-joints for lengthening or shortening them, there being, preferably, a rod, $g$, having adjusting pin-holes, a tube, $h$, into which said rod enters, a connecting-pin, $i$, and a screw-joint, $j$, by means of which a more accurate adjustment may be obtained.

The draft is applied in the center of the front trucks by means of a draft-chain, K, having a running connection with a sheave, L, around which the draft-cable M passes, but other similar draft connections may be applied.

In practice the parts are so arranged that at the normal or middle position of both carriages the four trucks run in a straight track, but by the operation of the steering-gear each end of the truck may be guided independently of the other, and by the proper joint action of the two the whole truck may turn any corner, and, even if desired, turn within its own space.

What we claim as our invention is—

1. In a truck for moving houses, four trucks independently pivoted to the truck-frame and provided with two independent steering-gears, one for the front trucks and one for the rear trucks, substantially as described.

2. In a truck for moving houses, the combination of a truck-frame mounted on four independently-pivoted trucks, of a steering-gear for the front trucks, of a steering-gear for the rear trucks, and of a draft attachment in the pivotal center of the front trucks, substantially as described.

3. In a truck for moving houses, in combination, a truck-frame, four two-wheeled trucks pivotally secured to the truck-frame independently of each other, and having guide-poles, cross-girts carrying rack-bars, carriages supported on said cross-girts and carrying a pinion and steering-wheel, and of connection between the guide-poles of the trucks and the carriages, substantially as described.

4. In a truck for moving houses, the combination, with a truck-frame laterally adjustable and mounted on four two-wheeled trucks independently pivoted to said frame, of two steering-gears for each pair of trucks, each consisting of a rack-bar mounted on a cross-girt, a carriage supported on said cross-girt, a pinion mounted on said carriage and carrying a steering-wheel, and adjustable connections between the carriage and the draft-poles of the respective trucks, substantially as described.

JOSEPH GOODMAN, Sr.
FREDRICK ALBERT GOODMAN.
JULIUS FRANK GOODMAN.

Witnesses:
H. S. SPRAGUE,
CHAS. THURMAN.